May 22, 1928. Re. 16,970
H. L. DE BAUGH ET AL
AUTOMOBILE CURTAIN
Original Filed Sept. 5, 1924
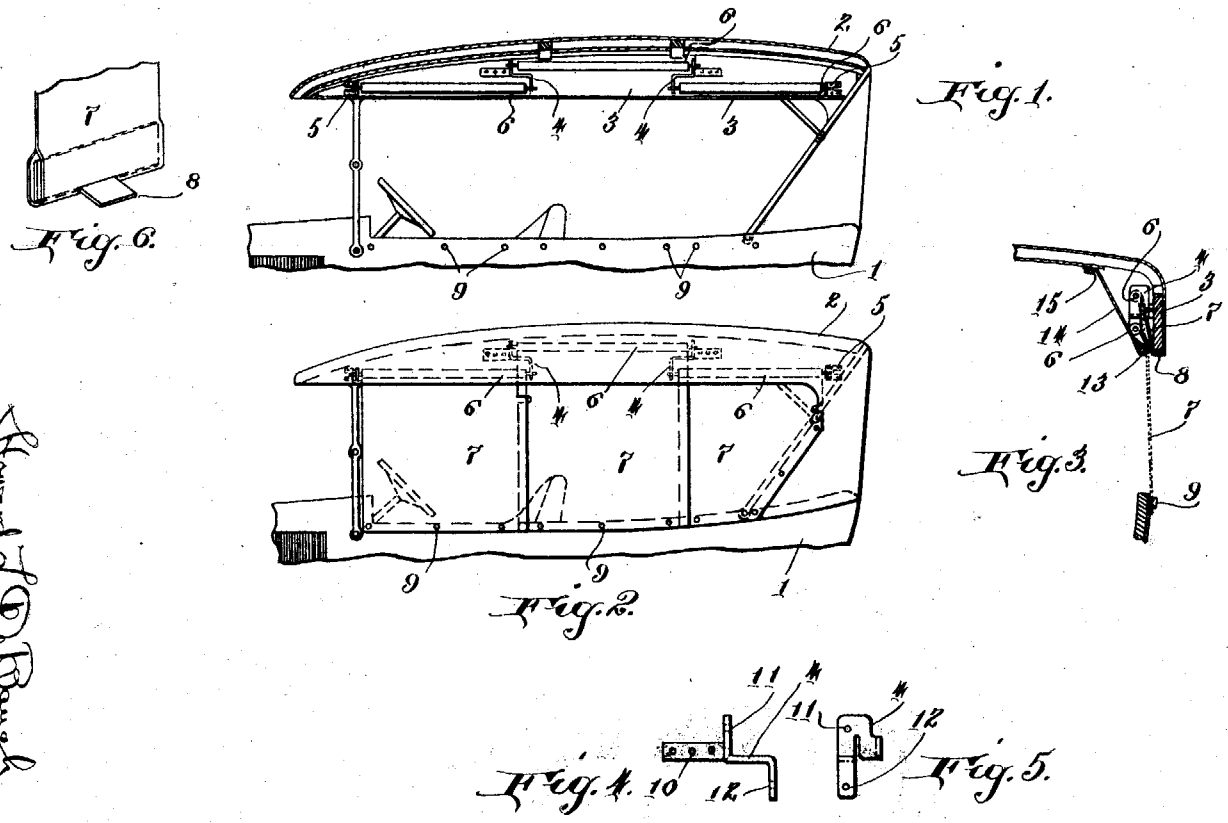
Witnesses
Inventors
Howard L. De Baugh
Ralph R. Meeks
J. Elmer Strayer
By Edwin F. Hannels
Attorney Reissued May 22, 1928. Re. 16,970

UNITED STATES PATENT OFFICE.

HOWARD L. DE BAUGH, OF TOWSON, RALPH R. MEEKS, OF BALTIMORE, AND JACOB ELMER STRAYER, OF TOWSON, MARYLAND, ASSIGNORS TO THE SUPERIOR MANUFACTURING COMPANY, A CORPORATION OF MARYLAND.

AUTOMOBILE CURTAIN.

Original No. 1,559,940, dated November 3, 1925, Serial No. 735,991, filed September 5, 1924. Application for reissue filed May 24, 1926. Serial No. 111,463.

This invention relates to improvements in automobile curtains, and has for its object to provide a simple and efficient means whereby the side curtains of an automobile are mounted upon rollers disposed along the inside of the automobile top so that they are out of the way and out of view, both from the inside and outside, when they are not in use, but which may be quickly and conveniently drawn down and secured at their lower ends in order to enclose the car when desired.

The invention consists of the novel construction and arrangement of the parts and combination of parts hereinafter more fully set forth in the following specification and pointed out in detail in the appended claims.

In the accompanying drawing:

Figure 1 is a side view of the body of an automobile, the top being sectioned, and shows our invention applied thereto, the curtains being shown in the raised position.

Figure 2 is a similar view to Figure 1, except that it shows the top in full and the curtains in the drawn position.

Figure 3 is a detail section of one side of the top.

Figure 4 is an enlarged detail view of one of the brackets which carry the center roller and one end of an end roller.

Figure 5 is an end view of Figure 4.

Figure 6 is a detail enlarged view of a portion of the lower end of the curtain taken at the center and showing the stop projecting therefrom.

Referring to the accompanying drawings, forming part of this specification, and in which like reference numerals designate like parts throughout the several views thereof, 1 designates the body of the automobile, and 2 the top thereof. On each side of the automobile top is a supporting strip 3 extending approximately the entire length thereof. This strip has been constructed of wood, but the particular kind of material is not regarded as essential to the invention. This strip is immediately inside the top covering as shown in Figure 3, and carries double roller brackets 4 projecting therefrom intermediately of its length, and a roller bracket 5 at each end. The spring rollers 6 carrying curtains 7 secured thereto are mounted in these brackets. Each of said curtains 7 is provided at its lower end with a stop 8 projecting therefrom and a number of snap eyes adapted to fit over the studs 9 on the body of the automobile. The brackets 4 are formed with a flat end having holes 10 for the reception of screws or nails to hold it to the strip 3 and its opposite end bent outwardly and downwardly is provided with holes 11 and 12 to receive the ends of the center and end rollers, respectively. The ends of the rollers are formed to cooperate with the brackets after the manner of the usual spring window shade rollers and brackets. Extending along the top of the automobile in close proximity to the lower edge of the strip 3 is a rod 13 to which is secured the lower edge of a longitudinal strip 14 of material which extends the entire length of the top on the inside, covering the rollers. This is preferably the same as the inside lining of the top, and the upper edge of said material 14 is supported in any suitable manner. As shown it is provided with a number of snap eyes which fit over the studs 15 inside the top. The strip 14 serves to conceal the curtains and brackets from view, and can be readily unfastened or loosened to afford access to the curtains or the rollers to which they are hung. The curtains operate up and down between the rod 13 and the strip 3 and when released will be drawn up by the action of the spring rollers, the stops 8 will prevent the curtain from going up too far between the said rod and strip, and hold them in the position shown in Figure 3 of the drawing.

It will be seen that when it is desired to quickly close the car, in case of rain for instance, the curtains are drawn down and snapped over the studs 9, and when it is desired to raise said curtains they are unfastened at the bottom and will be drawn up by the action of the spring rollers on which they are mounted, until the stops 8 strike the lower edge of the strip 3 where they will be held out of view.

An important advantage of the invention results from the fact that the curtains are closely confined at the top between the rod 13 and the strip 3 which are, as shown in the drawing, close together and on the opposite sides of the curtains. This prevents flapping or vibration of the curtains which in previous structures has resulted in most objectionable rattling, all noise of this sort being practically eliminated by the present device.

Having thus described our invention, what we claim is:

1. The combination with an automobile, of a wooden strip extending along the top of the automobile on each side thereof, a number of spring rollers mounted on said strip, a rod extending along the top of the automobile on the inside thereof adjacent the lower edge of the said wooden strip, curtains mounted on said rollers and operative between said rod and said wooden strip, stops on the bottom of said curtains, and a piece of material having one edge secured to said rod and its other edge removably secured to top of the automobile.

2. The combination with an automobile of a top having a substantially rigid support extending approximately the entire length of the top on each side thereof, spring rollers mounted on said supports, a rod extending longitudinally of the automobile top on the inside thereof close to the lower edge of said support on each side of the top, curtains mounted on said rollers and operative between said rod and said support whereby said curtains are supported in their operative position, stops at the bottoms of said curtains, means for securing the lower ends of the curtains to the automobile body when drawn, and means, detachable to give access to the rollers, said latter means covering the rollers and brackets on the inside of the top.

3. The combination with an automobile, of a top having a substantially rigid support extending approximately the entire length of the top on each side thereof, spring rollers mounted on said supports, means extending longitudinally at each side of the top on the inside thereof close to said support, curtains mounted on said rollers and operative between said means and said support whereby said curtains are supported in their operative position, said means concealing the rollers at the inside of the top and being movable with respect to the top so as to give access to the rollers.

4. The combination with a vehicle top having roller curtains supported within the quarters thereof, of a fabric shield at each side of said top extending over the inner face of each of said quarters and concealing said curtains when in rolled position, said shield being secured to said top adjacent its upper edge and provided with a looped lower edge and a stiffening member extending through said loop positioned adjacent to and spaced from the lower edge of said quarters for guiding said curtains when in unrolled or partly unrolled position.

5. In combination with a vehicle top having front and rear supports and roller curtains supported within its side quarters, a fabric shield on each side of said top and having one edge secured to said top concealing said curtains when in rolled position and provided with a looped lower edge, a stiffening member received in said looped edge, and means for securing said stiffening member to said supports.

6. In combination with a vehicle top having front and rear supports and roller curtains supported within its quarters, a fabric shield secured to said top above said curtains, the lower edge of said shield being looped, a longitudinally extending stiffening member enclosed in said looped edge, and means for securing said stiffening member to said supports whereby the lower edge of said shield forms a guide for said curtains.

In testimony whereof we affix our signatures, at Baltimore, Maryland, May 19th, 1926.

HOWARD L. DE BAUGH.
JACOB ELMER STRAYER.
RALPH R. MEEKS.